US011899470B2

(12) United States Patent
Wong et al.

(10) Patent No.: US 11,899,470 B2
(45) Date of Patent: Feb. 13, 2024

(54) AIRFRAME OF A VOLITANT BODY

(71) Applicant: Disney Enterprises, Inc., Burbank, CA (US)

(72) Inventors: Clifford W. Wong, Burbank, CA (US); Michael P. Goslin, Los Angeles, CA (US); Stephen A. Thornton, Redondo Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 88 days.

(21) Appl. No.: 17/109,898

(22) Filed: Dec. 2, 2020

(65) Prior Publication Data

US 2021/0237888 A1    Aug. 5, 2021

Related U.S. Application Data

(60) Provisional application No. 62/968,091, filed on Jan. 30, 2020.

(51) Int. Cl.
| | |
|---|---|
| *G05D 1/08* | (2006.01) |
| *G05D 1/10* | (2006.01) |
| *B64U 10/13* | (2023.01) |
| *B64U 30/20* | (2023.01) |
| *B64U 50/14* | (2023.01) |
| *B64C 1/06* | (2006.01) |

(Continued)

(52) U.S. Cl.
CPC ........... *G05D 1/0816* (2013.01); *B64C 1/061* (2013.01); *B64C 27/20* (2013.01); *B64C 39/022* (2013.01); *B64C 39/024* (2013.01); *G05D 1/101* (2013.01); *B64U 10/13* (2023.01); *B64U 30/20* (2023.01); *B64U 50/14* (2023.01); *B64U 2201/10* (2023.01)

(58) Field of Classification Search
CPC ........ B64C 2201/027; B64C 2201/108; B64C 2201/162; B64C 27/20
See application file for complete search history.

(56) References Cited

U.S. PATENT DOCUMENTS

| | | | |
|---|---|---|---|
| 2,377,835 A * | 6/1945 | Weygers | B64C 27/20 244/23 C |
| 9,555,879 B1 * | 1/2017 | Kaiser | B64C 27/10 |

(Continued)

FOREIGN PATENT DOCUMENTS

| | | | | |
|---|---|---|---|---|
| CA | 3014963 A1 * | 3/2019 | ........... | B64C 39/024 |
| CN | 107933891 A * | 4/2018 | ............. | B64C 11/00 |

(Continued)

*Primary Examiner* — Joshua J Michener
*Assistant Examiner* — Ryan Andrew Yankey
(74) *Attorney, Agent, or Firm* — Esplin & Associates, PC

(57) ABSTRACT

Systems, methods, and apparatuses for an airframe of a volitant body are presented herein. An apparatus may include a body having a normal axis. The body comprising a central air passage communicating through the body along the normal axis of the body. The central air passage may have an inlet at a first end of the body and an outlet at a second end of the body, the second end being opposite the first end. The central air passage may form an interior surface of the body. The central air passage permitting a flow of air through the body via the central air passage. The inlet may be formed to produce a Venturi effect in the flow of air passing through the central air passage from the inlet to the outlet by choking the flow of air at the inlet.

5 Claims, 7 Drawing Sheets

(51) Int. Cl.
  *B64C 27/20* (2023.01)
  *B64C 39/02* (2023.01)
  *G05D 1/00* (2006.01)

(56) References Cited

U.S. PATENT DOCUMENTS

| | | | |
|---|---|---|---|
| 10,269,257 B1* | 4/2019 | Gohl | B64C 39/024 |
| 11,173,997 B2* | 11/2021 | Toyama | B64C 39/024 |
| 11,352,132 B2* | 6/2022 | Breeze-Stringfellow | B64C 29/0025 |
| 11,390,369 B2* | 7/2022 | Toyama | A63H 27/00 |
| 11,519,434 B2* | 12/2022 | Neiser | F01D 7/00 |
| 11,530,034 B2* | 12/2022 | Morisaki | F04D 29/164 |
| 11,541,989 B2* | 1/2023 | Scholl | B64C 11/00 |
| 11,634,216 B2* | 4/2023 | Amante | B64C 29/0033 244/23 A |
| 2005/0205715 A1* | 9/2005 | Hansen | B64C 27/20 244/12.1 |
| 2010/0166554 A1* | 7/2010 | Dierksmeier | B64C 29/0025 415/220 |
| 2017/0369162 A1* | 12/2017 | Alzahrani | B64C 29/0033 |
| 2019/0339081 A1* | 11/2019 | Malhotra | B64D 47/08 |
| 2021/0094686 A1* | 4/2021 | Metzner | G08B 19/00 |
| 2023/0167838 A1* | 6/2023 | Neiser | F15D 1/008 416/120 |
| 2023/0182895 A1* | 6/2023 | Schaal | B64D 27/24 244/53 R |

FOREIGN PATENT DOCUMENTS

| | | | | |
|---|---|---|---|---|
| CN | 108516089 A | * | 9/2018 | B64C 27/08 |
| CN | 108945417 A | * | 12/2018 | B64C 27/20 |
| DE | 102018116149 B4 | * | 5/2023 | B64C 27/20 |
| EP | 1500589 A1 | * | 1/2005 | B60H 1/3442 |
| FR | 3077267 A1 | * | 8/2019 | B64C 27/08 |
| WO | WO-2004065208 A2 | * | 8/2004 | B64C 27/12 |
| WO | WO-2016166366 A1 | * | 10/2016 | A63H 27/12 |
| WO | WO-2018027315 A1 | * | 2/2018 | B64C 13/16 |
| WO | WO-2019197733 A1 | * | 10/2019 | B60H 1/3442 |
| WO | WO-2020128316 A1 | * | 6/2020 | B64B 1/66 |

* cited by examiner

AIRFRAME OF A VOLITANT BODY

FIELD OF THE DISCLOSURE

This disclosure relates to an airframe of a volitant body, and systems and method to control the volitant body.

BACKGROUND

Quadcopters, sometimes called drones, are becoming increasingly popular for both recreational and commercial use. Drones may be autonomous, remote-controlled, semi-autonomous, and/or controlled by other techniques. Drones are typically complex devices that use exposed spinning propellers and/or plastic rail guards in the same plane as the propellers to provide a minimal form of protection. Though they can maintain efficiency, the configurations of exposed propellers and/or using plastic rail guards may be unsafe. Upon collision of the drone with a user, the exposed spinning propellers may cause bodily harm.

SUMMARY

Some manufactures may encase a drone, or portions thereof, in a protective cage. The cage may expose the drone as the object of interest. That is, the cage is typically built for the specific purpose of encasing the drone for safety, but not hiding the drone entirely because users still need to see the drone itself to properly control it remotely from a distance. However, the cage may create turbulence and thus reduce thrust efficiency.

Certain racing drones, called "whoops", shroud each propeller slightly to maintain airflow and lift, but may be sized to enable high speed movement—a priority of a racing drone. Further, exposed spinning propellers may not hide the fact a drone is being used as a source of levitation and/or thrust. For some, drone-based toys may not be aesthetically pleasing because they look similar to their commercial counterparts. The propellers may be exposed for efficiency, but the toys may be deemed too dangerous for young users. Lastly, the toys are prone to breaking upon crashing or collision.

One or more aspects of the present disclosure relate to an airframe of a volitant body. One or more aspects of the present disclosure relate to systems, apparatuses, and methods of controlling a volitant body. An airframe may be configured to provide a concealed propulsion system. The airframe with the propulsion system may form a volitant body. The airframe may be configured to create a Venturi effect into a drone-like propulsion system. In accordance with one or more implementations of the present disclosure, the airframe may be much larger than the propulsion system itself (e.g., up to five times larger or even larger) while still maintaining airflow requirements for thrust, lift, and/or maneuverability via the propulsion system. In some implementations, the configuration of the airframe may result in the volitant body experiencing relatively slower speed movement than typically associated with use of a cage and/or shrouds, however with relatively increased stability and/or ability to hold position. Using a similar propeller setup as a whoop and/or other drone, while structurally enhancing the Venturi effect, the airframe may maintain dynamic thrust and performance, with acceptable maneuverability in the volitant body. One or more aspects of the present disclosure takes advantage of fast maneuvering thrust of a racing-style drone combined with a structure that slows motion and promotes stability at speed, but allows fast motion to correct its attitude while stationary. In other words: responsiveness at low speed to maintain static position in space (hover), stability/resistance at high speed to make it easy to fly.

In accordance with one or more configurations of the airframe and/or volitant body, one or more physical objects may be placed in and/or on the airframe. The placement of the one or more physical object may visually hiding the propulsion system. This may cause onlookers to perceive as if the one or more physical objects are "flying" and/or controlling the volitant body. For example, a physical object may comprise a toy figurine so that placement in and/or on the airframe may cause onlookers to perceive as if the toy figurine is flying/controlling the volitant body With the airflow efficiencies maintained, the airframe may be flown indoors or outdoors in light winds. The airframe may be solid. The airframe may be made out of relatively light materials such as one or more of polystyrene, wood (balsa), light plastics, and/or other materials.

One or more implementations of an airframe of a volitant body may include one or more components. The airframe of a volitant body may comprise a body. The body of the airframe may be defined with respect to a normal axis and/or other axes. The body may comprise a central air passage and/or other components. The central air passage may communicate through the body along the normal axis of the body. Along the normal axis of the body may include coaxially aligned with and/or parallel to the normal axis.

The body of the airframe may have a first end, a second end, and/or other features. The second end of the body may be opposite the first end. The central air passage may have an inlet at the first end of the body and/or an outlet at the second end of the body. The central air passage may form an interior surface of the body. The central air passage may permit a flow of air through the body of the airframe via the central air passage. The inlet may be formed to produce a Venturi effect in the flow of air passing through the central air passage from the inlet to the outlet by choking the flow of air at the inlet.

The airframe may take advantage of high power drone propulsion systems (compared to existing designs) that require relatively good laminar airflow that the structure of the airframe of the present disclosure provides. The airframe may hide the propulsion system from user sight. The airframe may cause the user and/or other onlookers to perceive an object attached in and/or on the airframe to appear as if the object is magically flying the volitant body. The airframe may carry a considerably more amount of weight than typical drones of the same size. The airframe may carry a propulsion system that is more compact. The airframe may be safer, may survive temporary collisions and bumps, and/or may be caught in the hand or tossed during launch without danger of being cut by a propeller.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
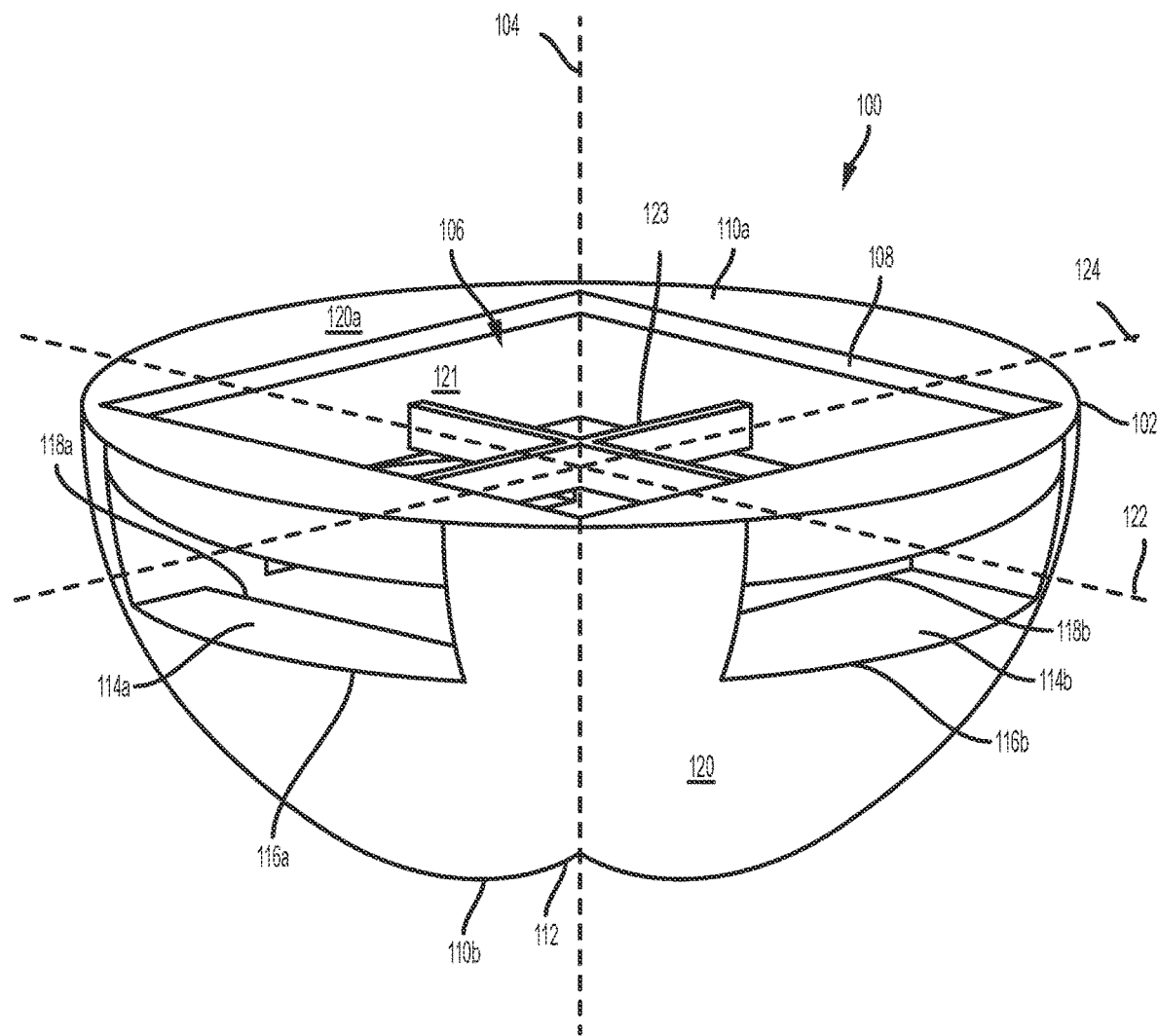
FIG. 1 illustrates a perspective view of an airframe, in accordance with one or more implementations.

FIG. 1 illustrates a top perspective view of an airframe 100 of a volitant body, in accordance with one or more implementations. Airframe 100 may be configured to conceal a propulsion system (not shown in FIG. 1). The airframe 100 may be configured to facilitate the mounting of one or more objects on one or more surfaces of the airframe 100. By way of non-limiting illustration, a toy figurine, animatronic toy, and/or other object, may be mounted on a surface of the airframe 100 to provide a visual of the object controlling the volitant body.

Figure 2:
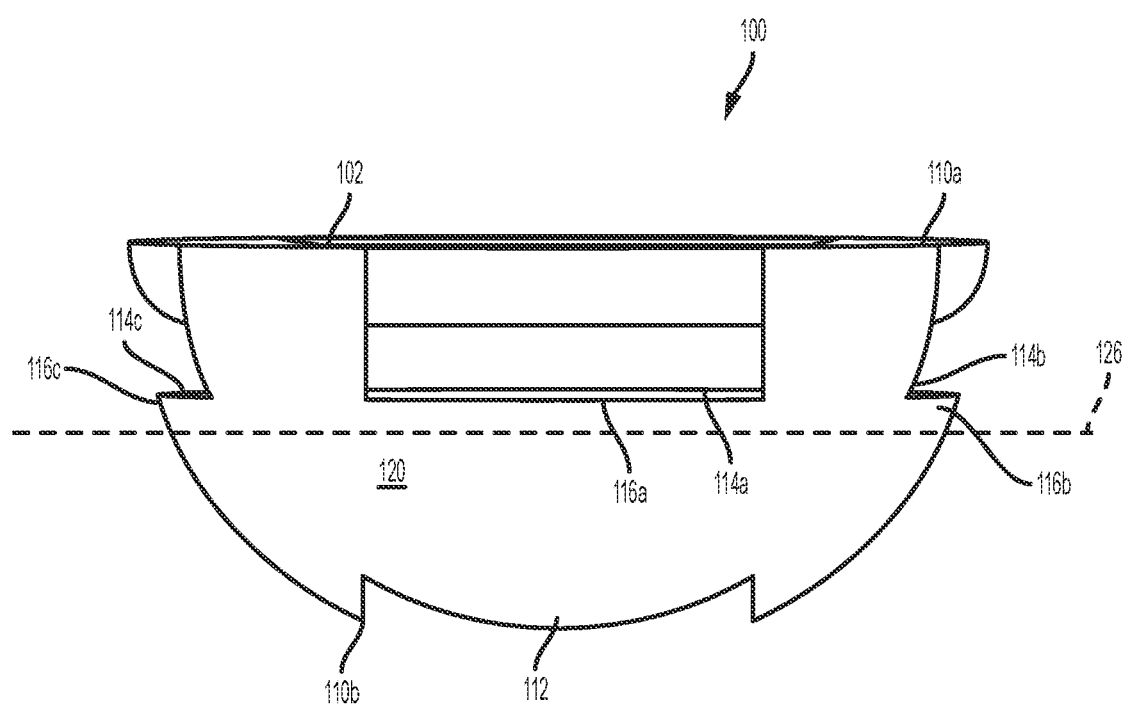
FIG. 2 illustrates a side view of the airframe of FIG. 1, in accordance with one or more implementations.

FIG. 2 illustrates a side view of the airframe 100 of FIG. 1, in accordance with one or more implementations. The propulsion system (not shown in FIG. 2) may be rigidly attached. In some implementations, the propulsion system may be removably attached though indirect techniques, such as one or more of friction fit, snap fit, and/or other attachment techniques. In some implementations, the propulsion system may be removably attached though direct attachment techniques, including one or more fixtures, latches, and/or other attachment components.

Referring to FIG. 1, airframe 100 may be configured in a substantially hemispherical shape and/or other shapes. Airframe 100 may comprise a body 102 and/or other components. The body 102 may be defined with respect to one or more of a normal axis 104, a longitudinal axis 124, a lateral axis 122, and/or other axes. The normal axis 104 may be defined with respect to a gravity vector and/or other reference. Body 102 may comprise one or more of a central air passage 106, a set of side airflow passages, a first end 110a, a second end 110b, an exterior surface 120, an interior surface 121, one or more interior structural elements 123, and/or other features. The second end 110b may be opposite first end 110a.

Central air passage 106 may communicate through body 102 along normal axis 104 of body 102. Central air passage 106 may communicate along normal axis 104 such that the central air passage 106 may be parallel to, and/or coaxially aligned with, normal axis 104. Central air passage 106 may have an inlet 108 at the first end 110a of body 102 and an outlet 112 at the second end 110b of body 102. Central air passage 106 may form the interior surface 121 of body 102. Central air passage 106 may permit and/or facilitate a flow of air through body 102 via central air passage 106. In some implementations, a mesh netting and/or other material may be placed over the first end 110a and/or inlet 108 to conceal components housed within the body 102 without affecting the flow of air into the central air passage 106. The one or more interior structure elements 123 may include braces and/or other rigidizing components spanning the central air passage 106 and/or other portions of body 102.

Inlet 108 may be formed to produce a Venturi effect in the flow of air passing through central air passage 106 from inlet 108 to outlet 112. By way of non-limiting illustration, inlet 108 may be formed and/or arranged to choke the flow of air at inlet 108. In some implementations, inlet 108 may taper from a wide end to a narrow end. The wide end may be adjacent the first end 110a of body 102. The narrow end may be opposite the wide end, e.g., closer to the outlet 112 side of the central air passage 106. In some implementations, inlet 108 may taper from the wide end to the narrow end curvilinearly and/or in a straight line taper. Vanes (not shown) may be incorporated in the central air passage 106 by protruding from the interior surface 121. The vanes may be oriented along the normal axis 104. Oriented "along" the normal axis 104 may include being parallel to, or substantially parallel to, the normal axis 104. Vertically oriented vanes maybe present in the central air passage 106.

In some implementations, the set of side airflow passages may include one or more passages. The set of side airflow passages may include four passages and/or other quantity of passages. The set of side airflow passages may include one or more of side airflow passage 114a, side airflow passage 114b, side airflow passage 114c (FIG. 2), and/or other side airflow passages. The side airflow passage 114b may be opposite the side airflow passage 114c (FIG. 2). The side airflow passages 114a may be opposite a fourth side airflow passage (not shown in the views of FIG. 1 and/or FIG. 2). In some implementations, a total area of an inlet of a side airflow passage may not exceed about ⅓ (approx. 30%) of the top inlet 108 area.

The side airflow passages may be evenly spaced and/or arranged around body 102 and/or normal axis of body 104 such that individual side airflow passages may be disposed in individual quadrants of the body 102. Individual side airflow passages may extend substantially orthogonal to normal axis 104. Individual side airflow passages may extend from individual side inlets on an exterior surface 120 of body 102 to individual side outlets at interior surface 121.

For example, in FIG. 1, side airflow passage 114a may extend substantially orthogonal to normal axis 104. Side airflow passage 114a extending substantially orthogonal to normal axis 104 may include side airflow passage 114a extending along (e.g., parallel to and/or coaxially aligned with) longitudinal axis 124. Side airflow passage 114a may extend from side inlet 116a to side outlet 118a. Moreover, as shown in FIG. 1, side airflow passage 114b may extend substantially orthogonal to normal axis 104. Side airflow passage 114b extending substantially orthogonal to normal axis 104 may include side airflow passage 114b extending along (e.g., parallel to and/or coaxially aligned with) lateral axis 122. Side airflow passage 114b may extend from side inlet 116b to side outlet 118b. Other side airflow passages may be similarly formed. As a result, the individual side airflow passages may permit individual flows of air from an ambient environment into central air passage 106. The flow of air through the side airflow passages may make up for any airflow reductions through inlet 108 should one or more objects be positioned at or near inlet 108.

In some implementations, body 102 may include one or more mounting components configured to mount a propulsion system to body 102 substantially within central air passage 106. As a result, activating the propulsion system may cause the flow of air through body 102 via central air passage 106.

In some implementations, central air passage 106 may have a substantially square cross sectional profile (see, e.g., FIGS. 3-5) and/or other shaped cross sectional profiles. In some implementations, the cross sectional profile of the central air passage 106 may be dimensioned to maximize a propeller size of the propellers/rotors of the propulsion system. Those skilled in the art may recognize that the overall size and/or dimension of body 102 may be varied to achieve a desired power-to-weight ratio given a particular propulsion system.

Referring to FIG. 1, in some implementations, body 102 may have a substantially hemispherical shape forming a portion of exterior surface 120 which is curved and an exterior base surface 120a which may be substantially flat. The exterior base surface 120a may be disposed at first end 110a of body 102. The term "base" in "exterior base surface" may refer to a base of the hemispherical shape itself, and not necessarily the base of the body 102 itself. Instead, it is to be noted that the exterior base surface 120a may comprise a "top" and/or "upper" surface of the body 102 during use.

In FIG. 2, body 102 of airframe 100 may have a midline 126 (shown by the imaginary dashed line). The midline 126 may represent a plane and/or line that may be equally distant from first end 110a and second end 110b. In some implementations, a propulsion system (not shown in FIG. 2) may be mounted below the midline 126. In some implementations, a propulsion system may be mounted such that it may be flush, or substantially flush, with the second end 110b. In some implementations, a propulsion system may be mounted such that a center of mass of the airframe 100 including a propulsion system lies above the position of the propulsion system. In some implementations, a propulsion system may be mounted such that a center of mass of the airframe 100 including a propulsion system lies below the position of the propulsion system.

Figure 3:
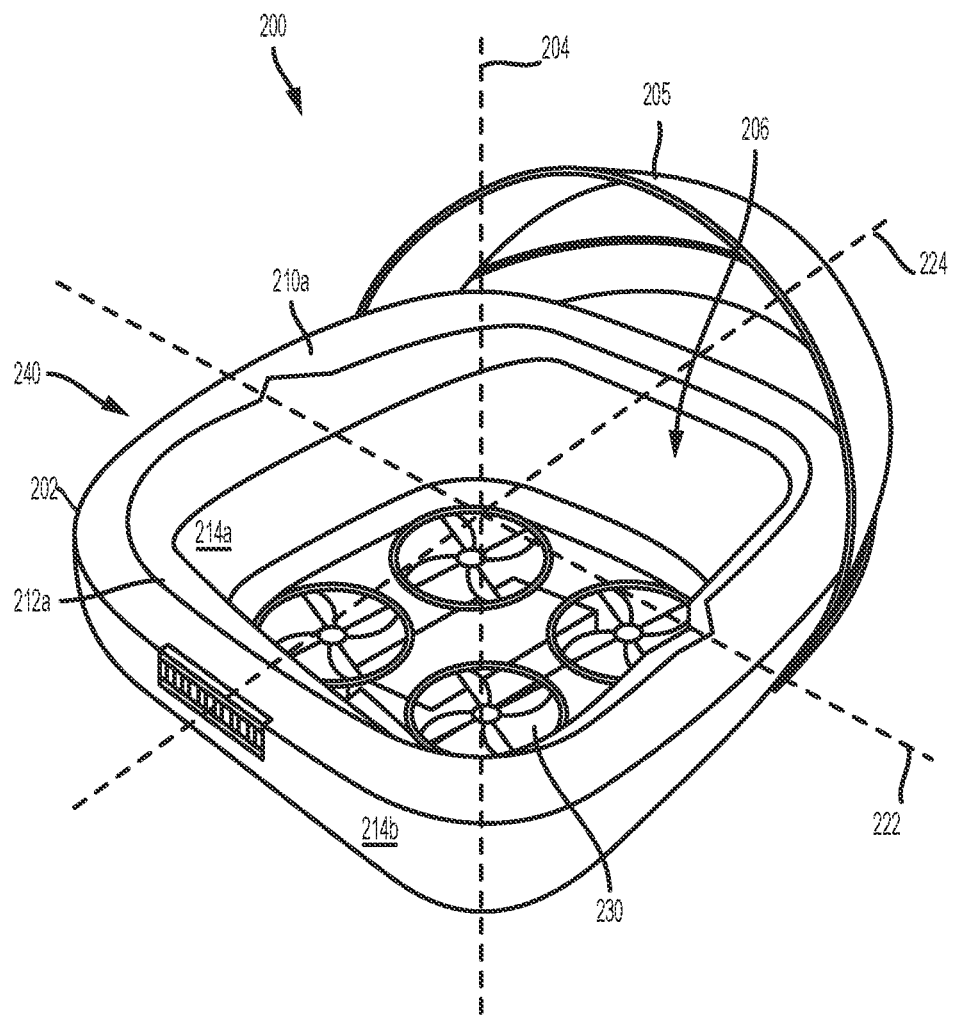
FIG. 3 illustrates a view of an arrangement comprising an airframe that is the same as, or similar to, the airframe of FIG. 1, and a propulsion system, in accordance with one or more implementations.
Figure 4:
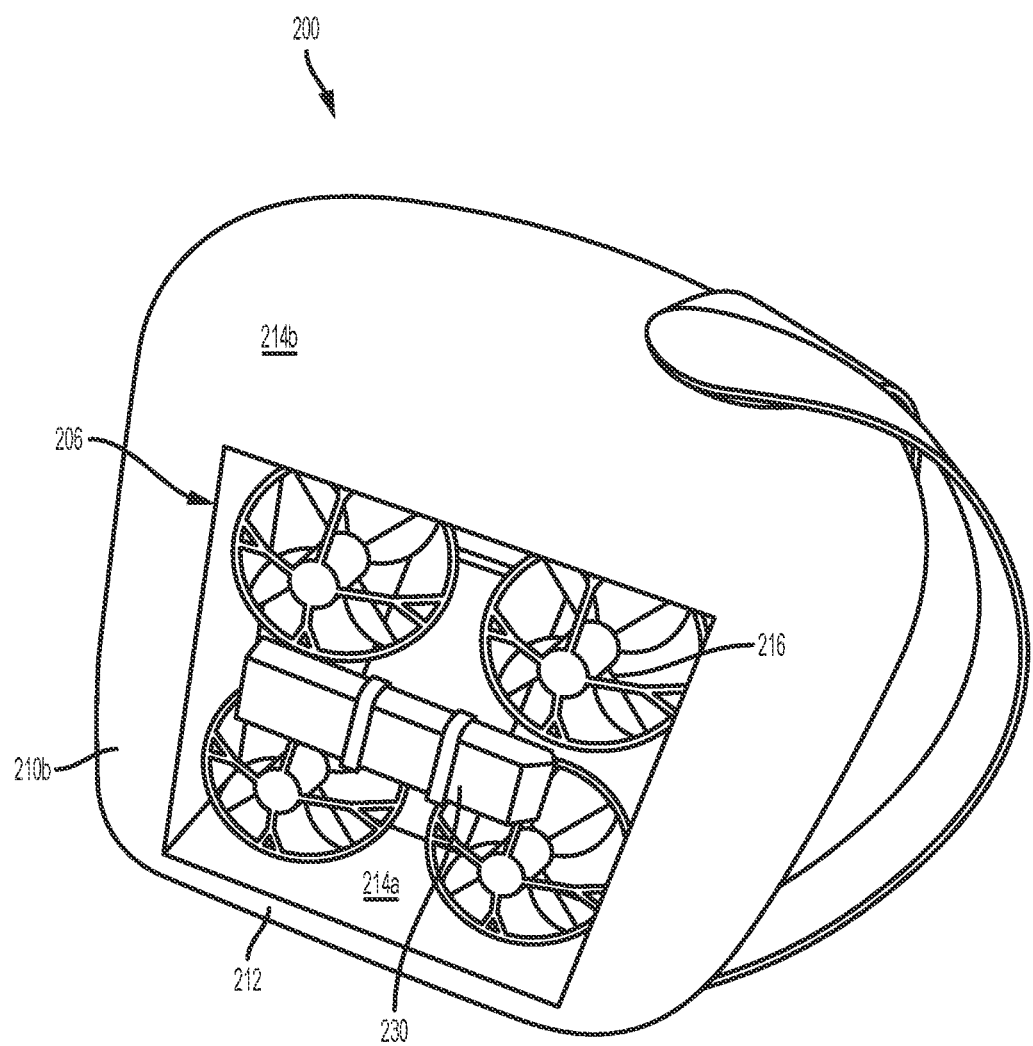
FIG. 4 illustrates a view of the arrangement of FIG. 3, in accordance with one or more implementations.

FIG. 3 and FIG. 4 illustrate an arrangement 200 of a volitant body, in accordance with one or more implementations. FIG. 3 illustrates a top perspective view of arrangement 200. FIG. 4 illustrates a bottom perspective view of arrangement 200.

Referring to FIG. 3, arrangement 200 may comprise one or more of a propulsion system 230, an airframe 240, an accessory 205, and/or other components. Airframe 240 may be the same as or similar to airframe 100 of FIG. 1 and/or FIG. 2. Likewise, airframe 240 may comprise a body 202 having one or more of a normal axis 204, a lateral axis 222, longitudinal axis 224, and/or other features. Body 202 may comprise a central air passage 206 communicating through the body 202 along normal axis 204. Lateral axis 222 and longitudinal axis 224 may run across body 202. Central air passage 206 may have an inlet 212a at a first end 210a of body 202 and an outlet at a second end of the body 202 (see, e.g., an outlet 212 at a second end 210b of body 202 in FIG. 4). Second end 210b in FIG. 4 may be opposite first end 210a of FIG. 3.

In FIG. 3, central air passage 206 may form an interior surface 214a of body 202. An exterior surface 214b may be an outer surface of body 202. Central air passage 206 may permit a flow of air through body 202 via central air passage 206. The inlet 212a may be formed to produce a Venturi effect in the flow of air passing through the central air passage from the inlet to outlet 212 (see, e.g., FIG. 4) by choking the flow of air at the inlet 212a.

In some implementations, body 202 may have a substantially rectangular cross section defining a short side and a long side. The short side may define a direction of a lateral axis 222 of the body, and the long side may define a direction of a longitudinal axis 224 of body 202. Although not shown, body 202 may include one or more side airflow passages the same as or similar to body 102 of airframe 100 in FIG. 1 and/or FIG. 2. Accessory 205 may comprise a shroud and/or other physical object. The accessory may be attached to the body 202 to define a front of the arrangement 200. The accessory 205 may be a toy component to cause the arrangement 200 to appear like a fanciful aircraft.

In FIG. 3, propulsion system 230 may be mounted to body 202 and/or substantially disposed within central air passage 206. In some implementations, the propulsion system 230 may include a controller for controlling one or more multi-bladed rotors 216 (see, e.g., FIG. 4) and/or propellers to generate lift, thrust, and/or otherwise propel the arrangement 200 in one or more directions. As a result, activating propulsion system 230 may cause the flow of air through body 202 via central air passage 206 from the first end 210a to the second end 210b (see, e.g., FIG. 4). Propulsion system 230 may be mounted to body 202 such that a center of mass of arrangement 200 may be between propulsion system 230 and first end 210a. That is, the propulsion system 230 may be mounted so that the arrangement 200 may be considered slightly "top heavy." In some implementations, propulsion system 230 may be mounted below a midline (not illustrated but the same as or similar to midline 126 of FIG. 2) of body 202.

Referring to FIG. 4, in some implementations, propulsion system 230 may comprise one or more multi-bladed rotors 216 configured to generate aerodynamic lift and/or thrust in one or more directions.

Figure 5:
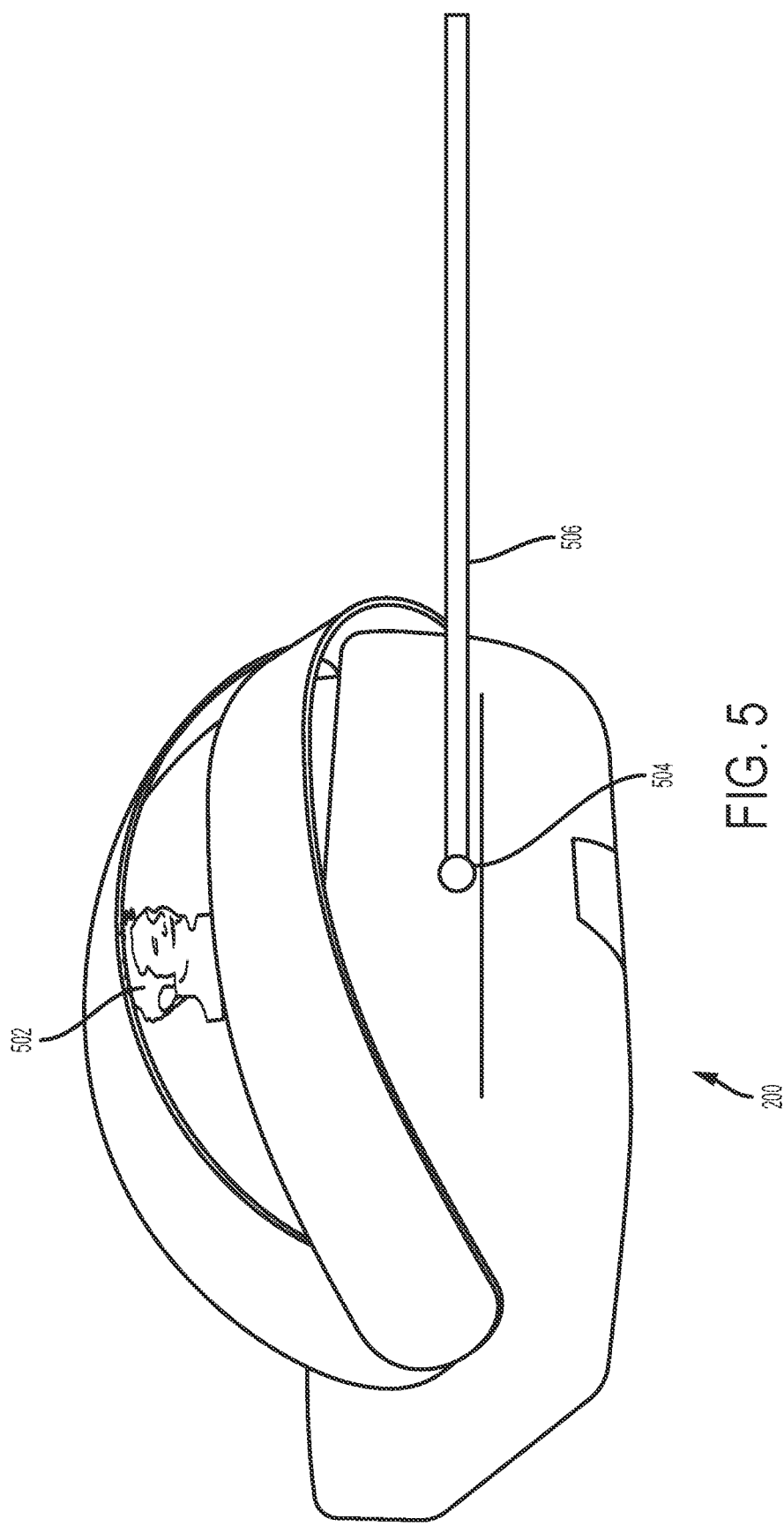
FIG. 5 illustrates a view of an implementation of the arrangement of FIG. 3 in flight.

FIG. 5 illustrates an implementation of arrangement 200. As a result of the above described airframe 100 and/or airframe 240, arrangement 200 may propel up, down, and/or in various other directions. Furthermore, arrangement 200 may have relatively slower speed movement but increased stability and position hold while still maintaining dynamic performance with acceptable maneuverability.

FIG. 5 further illustrates an object 502, such as a toy figurine, mounted within the airframe of the arrangement 200 to make it appear as if the object 502 is flying the arrangement 200. The object 502 may resemble a character, such as one or more of a movie character, a game character, and/or other objects.

In some implementations, a propulsion system may include one or more of a controller, one or more sensors, and/or other components. The controller may be configured to control one or more multi-bladed rotors and/or propellers to generate lift, thrust, and/or otherwise propel the arrangement 200 in one or more directions. In some implementations, the controller may obtain external inputs which may dictate the control of the arrangement 200 by the controller. By way of non-limiting illustration, inputs may be provided a leash 506 (or tether) attached to the airframe, via, for example, an attachment component 504. The leash 506 may comprise a flexible rope, string, and/or other devices. The attachment component 504 may facilitate removable attachment and/or fixed attachment. By way of non-limiting illustration, the attachment component 504 and/or an end of the leash 506 may include magnets and/or other removable fasteners (e.g., snap fits, hook and loop fasteners, and/or other fasteners).

In some implementations, a user may provide inputs to the controller by pulling, tugging, and/or otherwise applying a force to the arrangement 200 via leash 506. The inputs may cause the arrangement 200 to maneuver in a direction of an applied force and/or in other directions (e.g., in a direction opposite the applied force). In this manner, a user may be able to "walk" the arrangement 200 similar to walking an animal, with the arrangement 200 in tow.

Figure 6:
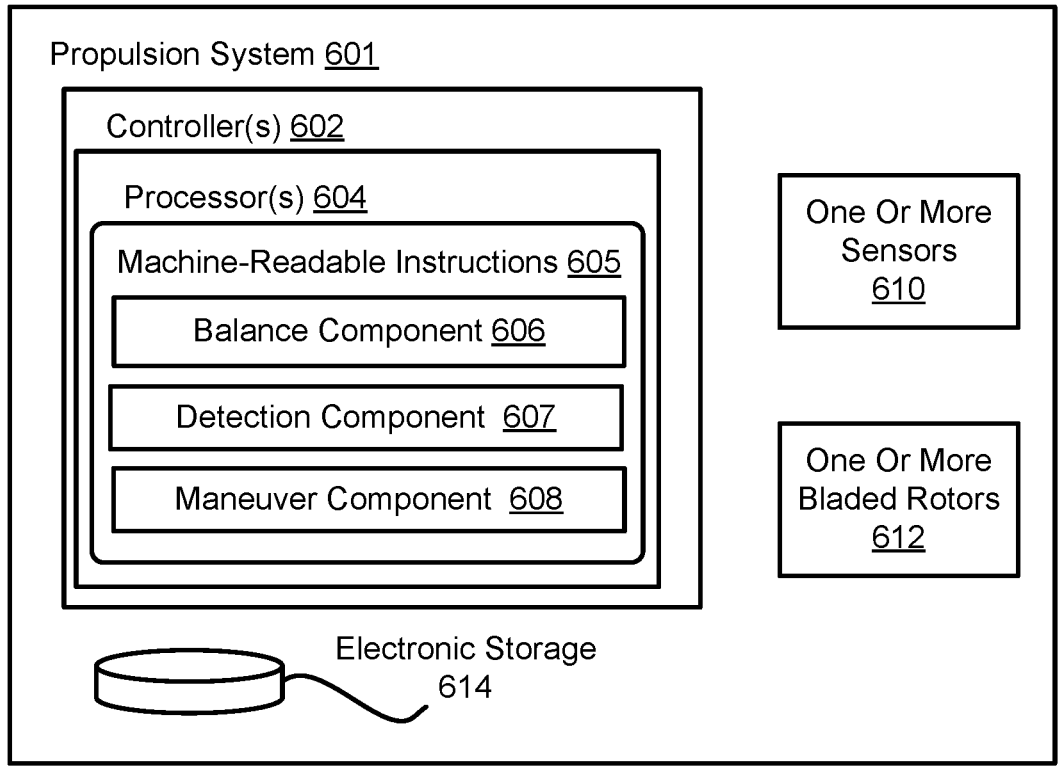
FIG. 6 illustrates a propulsion system, in accordance with one or more implementations

FIG. 6 illustrates a propulsion system 601 of a volitant body, in accordance with one or more implementations. The propulsion system 601 may include one or more of one or more controllers 602, one or more sensors 610, one or more bladed rotors 612 and/or propellors, electronic storage 614, and/or other components. The one or more sensors 610 may include one or more of one or more force sensors, one or more image sensors (e.g., a camera), and/or other sensors.

The controller(s) 602 may include one or more physical processors 604 configured by machine-readable instructions 605. Executing the machine-readable instructions 605 may cause the one or more physical processors 604 to facilitate control of an arrangement comprising the propulsion system 601 and an airframe (not shown in FIG. 6). The machine-readable instructions 605 may include one or more computer program components. The one or more computer program components may include one or more of a balance component 606, a detection component 607, a maneuver component 608, and/or other components.

The balance component 606 may be configured to control the propulsion system 601 to balance the arrangement in place at a given altitude. Balancing may include applying thrust via one or more bladed rotors 612 as needed to prevent the arrangement from flying in any given direction. This may be referred to as "holding" a position.

The detection component 607 may be configured to detect a force being applied to the arrangement via a leash (or tether) and/or other external body. The detection component 607 may be configured to determine force information based on output signals of a force sensor and/or other sensors. The force information may include one or more of a direction of the force, a magnitude of the force, and/or other information.

The maneuver component 608 may be configured to control the propulsion system 601 based on the force information (e.g., the direction of force, magnitude of force, and/or other information) and/or other information. The maneuver component 608 may be configured to control the propulsion system 601 to propel the arrangement in a direction of the force. Propelling may include reducing the balancing control by balance component 606 in the direction of the force. Propelling may include applying thrust via one or more bladed rotors 612 in the direction of the force. In some implementations, the thrust applied in the direction of the force may be proportional to a magnitude of the force. In some implementations, reducing the balancing control by balance component 606 and/or applying thrust may be variable such that the propelling of the arrangement in the direction of the force may be non-uniform in its relationship to the application of force. Non-uniform may include reducing the balancing control by balance component 606 and/or applying thrust in a direction opposite to (and/or orthogonal to) the direction of the force. In this way the arrangement may more closely match the experience of "walking" an animal which may not always be responsive to the application of force.

In some implementations, detection component 607 may be configured to detect presence of a user. Detection may be based on output signals of an image sensor (e.g., conveying image information defining one or more images). Detection may be based on one or more image-processing techniques, for example, machine/computer vision. In some implementations, the user may wear a targeting beacon which may be detected to detect presence of the user. The beacon may include one or more light sources. The one or more light sources may emit a light that may be detected via an image sensor. The light may be infrared light and/or of a visible wavelength of light.

The detection component 607 may be configured to determine, based on output signals of the image sensor and/or other sensors, user information. The user information may include one or more of a distance of the user from the arrangement, a direction of movement of the user, a relative velocity and/or acceleration of the user in the direction, and/or other information about the user relative the arrangement.

The maneuver component 608 may be configured to control the propulsion system 601 to propel the arrangement based on the user information. Control based on the user information may include propelling the arrangement in the direction of the movement of the user. Controlling the propulsion system 601 to propel the arrangement in the direction of the movement of the user may include maintaining a given distance from the user and/or other control. Controlling the propulsion system 601 to propel the arrangement in the direction of the movement of the user may include propelling the arrangement at a velocity and/or acceleration that matches that of the user.

Figure 7:
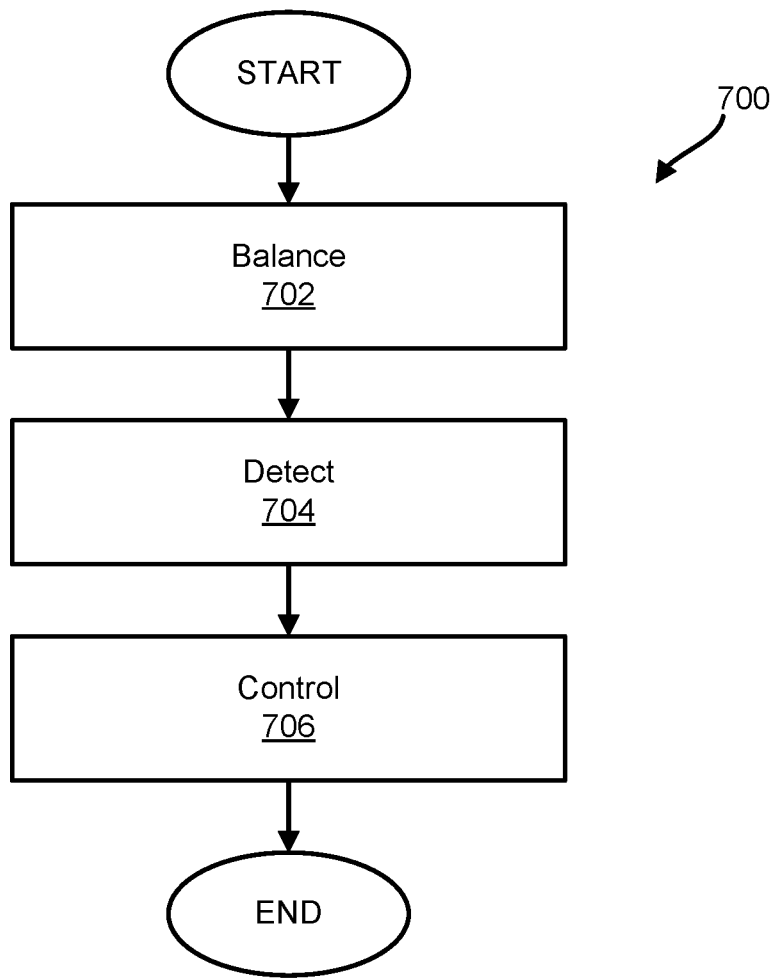
FIG. 7 illustrates a method to control a volitant body, in accordance with one or more implementations.

FIG. 7 illustrates a method 700 to control an arrangement comprising a propulsion system and an airframe forming a volitant body, in accordance with one or more implementations. The operations of method 700 presented below are intended to be illustrative. In some implementations, method 700 may be accomplished with one or more additional operations not described and/or without one or more of the operations discussed. Additionally, the order in which the operations of method 700 are illustrated in FIG. 7 and described below is not intended to be limiting. In some implementations, the order may be followed as shown. In some implementations, the method 700 may be performed automatically and/or autonomously such that a user may perceive the operations of the method 700 are performed without direct user intervention.

In some implementations, method 700 may be implemented in one or more processing devices (e.g., a computing platform, controller(s), a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

An operation 702 may include controlling a propulsion system to balance the arrangement in place at a given altitude. Balancing may include applying thrust via one or more bladed rotors as needed to prevent the arrangement from flying in any given direction. In some implementations, operation 702 may be performed by one or more physical processors executing a computer program component the same as or similar to balance component 606 (shown in FIG. 6 and described herein).

An operation 704 may including detecting a force being applied to the arrangement via a leash (or tether). Detecting a force may include determining, based on output signals of a force sensor, one or more of a direction of the force, a magnitude of the force, and/or other information. In some implementations, operation 704 may be performed by one or more physical processors executing a computer program component the same as or similar to detection component 607 (shown in FIG. 6 and described herein).

An operation 706 may include controlling the propulsion system based on detected force (e.g., the direction, magnitude, and/or other information) and/or other information. Controlling may include propelling the arrangement in a direction of the force. In some implementations, operation 706 may be performed by one or more physical processors executing a computer program component the same as or similar to maneuver component 608 (shown in FIG. 6 and described herein).

In some implementations, operation 704 may including detecting presence of a user and/or determining user information. Detection may be based on output signals of an image sensor (e.g., conveying image information defining one or more images). The user information may include one or more of a distance of the user from the arrangement, a direction of movement of the user, a relative velocity and/or acceleration of the user in the direction, and/or other information about the user relative the arrangement. In some implementations, operation 704 may be performed by one or more physical processors executing a computer program component the same as or similar to detection component 607 (shown in FIG. 6 and described herein).

In some implementations, operation 706 may include controlling the propulsion system based on the user information. Controlling may include propelling the arrangement in the direction of the movement of the user. Controlling may include maintaining a given distance from the user and/or other control. Controlling may include propelling the arrangement at a velocity and/or acceleration that matches that of the user. In some implementations, operation 706 may be performed by one or more physical processors executing a computer program component the same as or similar to maneuver component 608 (shown in FIG. 6 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An airframe of a flying toy device comprising:
    a body having a normal axis, the body comprising:
        an interior surface defining a central air passage communicating through the body along the normal axis of the body, the interior surface being formed such that a flow of air is permitted through the body via the central air passage;
        an air inlet at a first end of the body and an air outlet at a second end of the body, the second end being opposite the first end, wherein the air inlet tapers from a wide end to a narrow end, the wide end being at the first end of the body, the narrow end being opposite the wide end;
        a portion of the interior surface which starts at the narrow end of the air inlet and terminates at an opening of the outlet, the portion of the interior surface defining a constricted section of the central air passage;
        an exterior curved surface and an exterior flat surface, wherein the exterior flat surface is disposed at the first end of the body, wherein the exterior curved surface forms a substantially hemispherical shape of the body; and
        a set of side airflow passages evenly spaced around the body, wherein individual side airflow passages are disposed substantially orthogonal to the normal axis, the individual side airflow passages having individual side inlets at the exterior curved surface of the body which follow a contour of the exterior curved surface, the individual side airflow passages having individual side outlets at the portion of the interior surface such that the individual side outlets open into the constricted section of the central air passage, such that the individual side airflow passages permit individual flows of air from an ambient environment into the constricted section of the central air passage.

2. The airframe of claim 1, wherein the air inlet tapers from the wide end to the narrow end curvilinearly.

3. The airframe of claim 1, wherein the body further includes one or more mounting components configured to mount a propulsion system to the interior surface of the body so that the propulsion system is substantially within the constricted section of the central air passage, wherein activating the propulsion system causes the flow of air through the body via the central air passage.

4. The airframe of claim 1, wherein the constricted section of the central air passage has a substantially square cross sectional profile.

5. The airframe of claim 1, wherein the body has a substantially rectangular cross section defining a short side and a long side, wherein the short side defines a direction of a lateral axis of the body, and the long side defines a direction of a longitudinal axis of the body.

* * * * *